April 10, 1945. F. ALABRUNE 2,373,086
TRANSPORTATION METHODS
Filed July 23, 1942 3 Sheets-Sheet 1
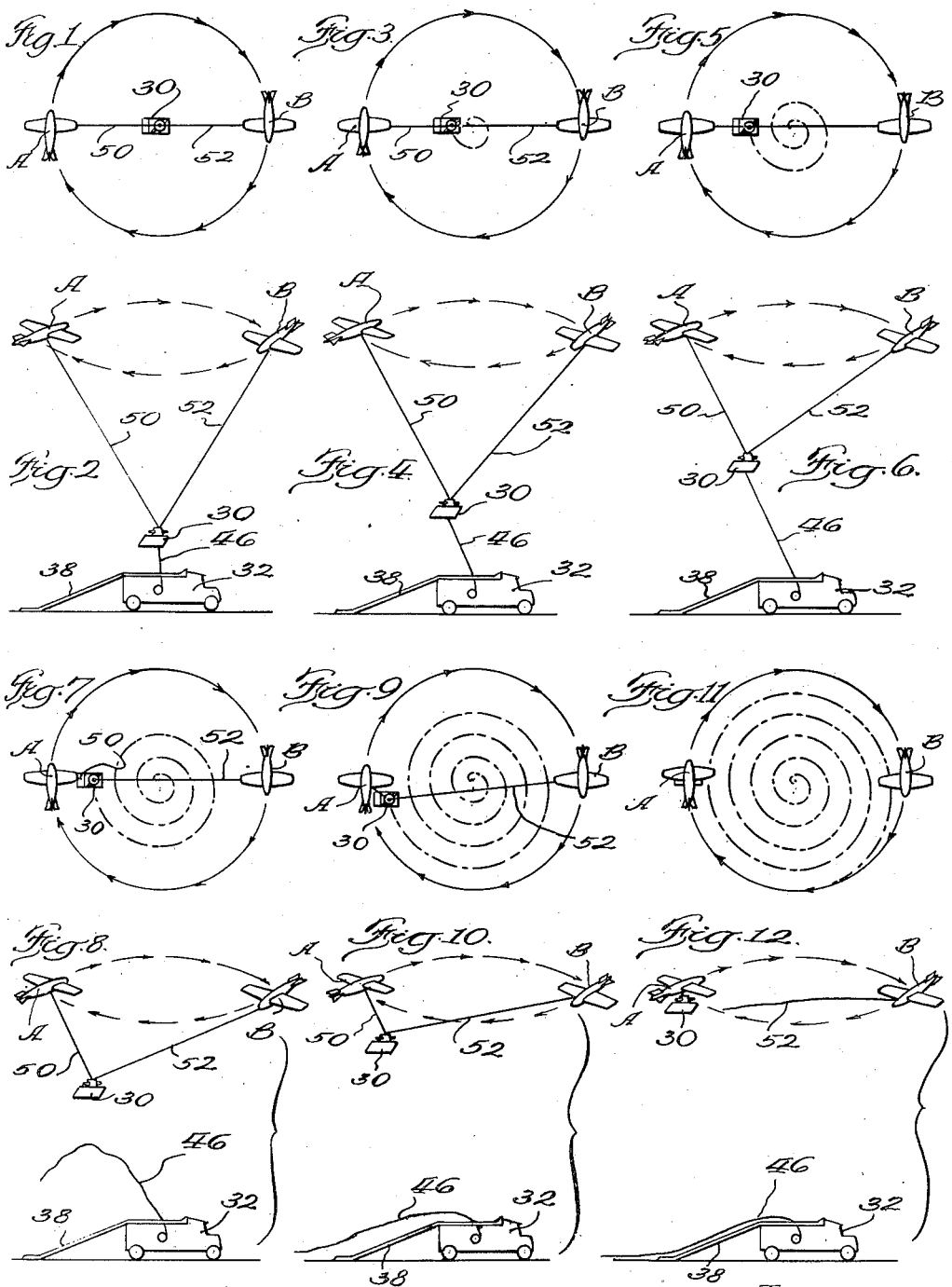

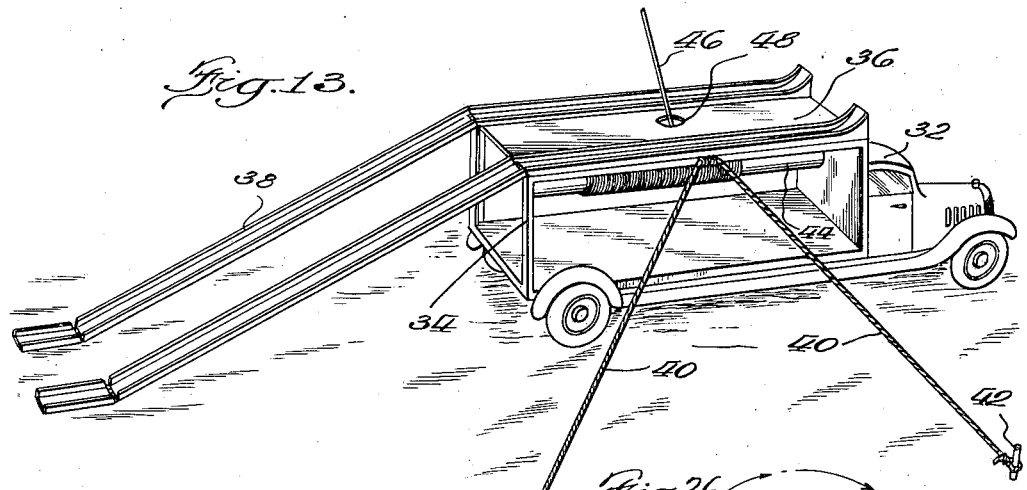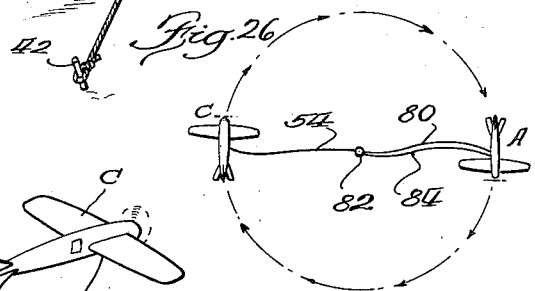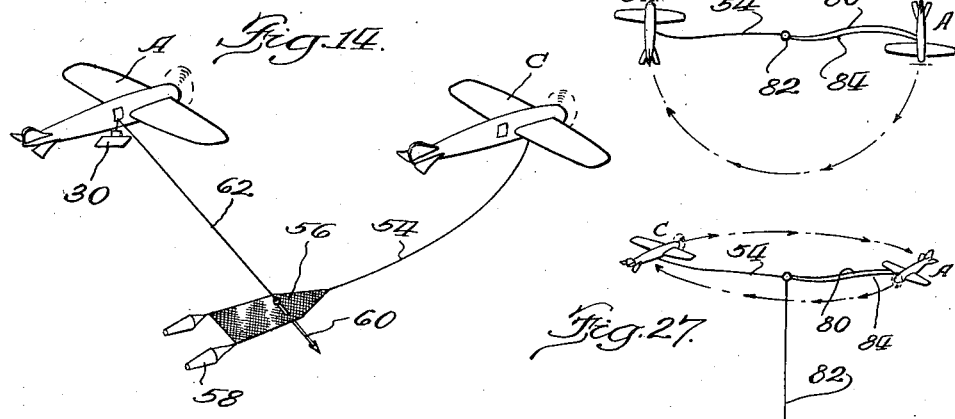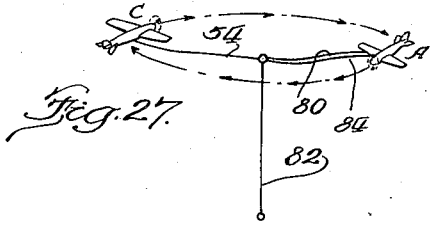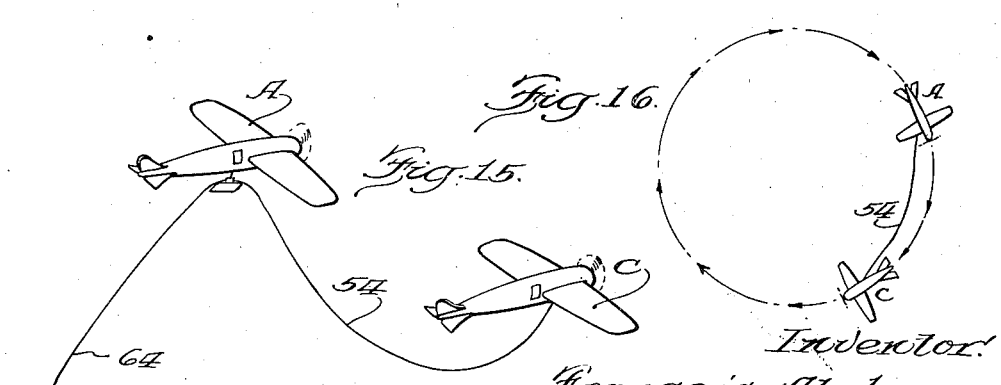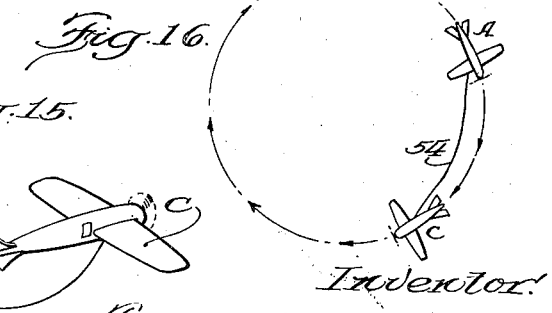

April 10, 1945.  F. ALABRUNE  2,373,086
TRANSPORTATION METHODS
Filed July 23, 1942   3 Sheets-Sheet 3
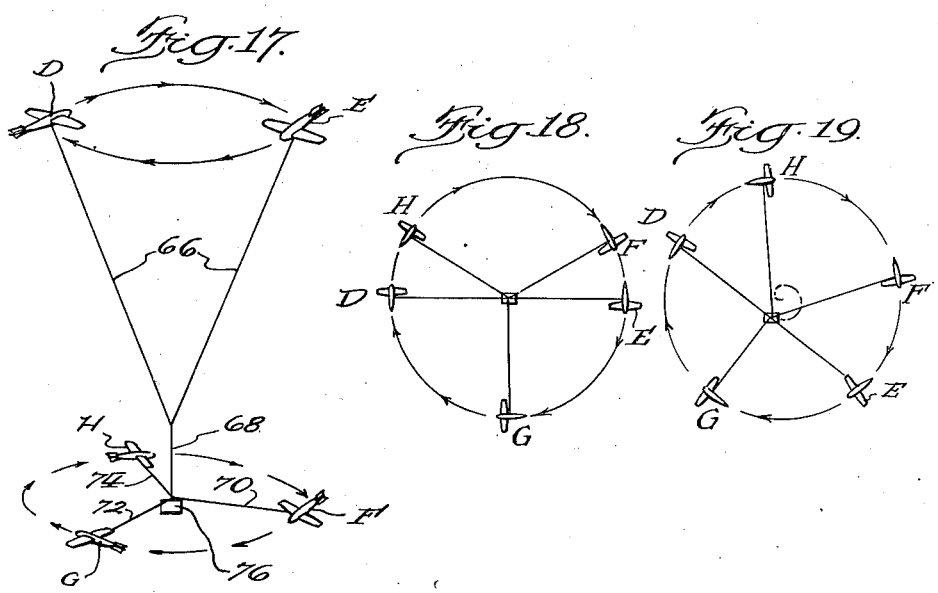
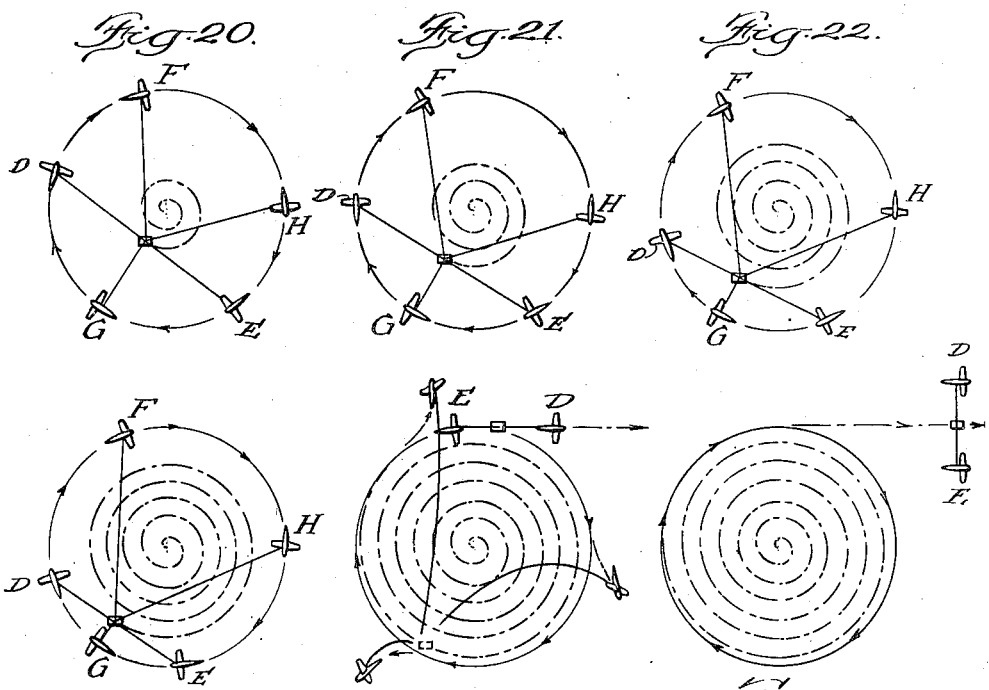
Inventor:
François Alabrune
By Williams, Bradbury & Hinkle
Attys Patented Apr. 10, 1945

2,373,086

UNITED STATES PATENT OFFICE 2,373,086

TRANSPORTATION METHOD

François Alabrune, Chicago, Ill.

Application July 23, 1942, Serial No. 452,021

20 Claims. (Cl. 258—1.4)

This invention relates to the art of aerial transportation, particularly of large objects by airplanes, and in some of its aspects may be considered an improvement over the method that forms the subject matter of my copending U. S. patent application, Serial No. 368,659, filed December 5, 1940, and issued as a patent on October 13, 1942, Patent No. 2,298,912.

In the transportation of loads by airplanes, it is the common practice to stow the load within the aircraft or in some few instances in a position beneath the aircraft fuselage or wings. In any event, the size of the load an aircraft normally can carry is largely limited by reasonable airplane take-off requirements. That is, once the airplane is in the air, it can support, and economically carry, a load greater than it can lift from the ground in a take-off run of any reasonable distance.

With the above in mind, it will be seen that frequently it is desirable to convey loads by aircraft to or from inaccessible locations where no adequate airport is available. Under other circumstances, it may be desired to convey loads too large to be lifted from any ordinarily available airport, and further that under some circumstances, it may be desired to transport loads which are too bulky to be housed within an airplane and which cannot be secured in a position beneath the airplane since insufficient room is available between the lower surface of the vehicle and the ground.

It is the principal object of the present invention to provide a novel method for enabling airplanes to transport loads in the above categories. The method also includes the provision of the necessary steps for lifting the loads from a position at rest upon the ground into a position within or adjacent to one or more airplanes in flight, and later depositing these loads upon the ground at a desired point while the airplane or airplanes remain in flight. Further it includes the provision of a method for performing the necessary steps for flexibly connecting two airplanes while they are in flgiht and for connecting the two airplanes in flight with objects upon the ground.

It is another object of the present invention to provide a novel method for enabling one or more aircraft to carry loads larger than any heretofore considered practical.

It is another object of the present invention to provide a novel method for the conveyance by aircraft of bulky loads which cannot be stored within the aircraft.

Still another object of the present invention is to provide an improved method for enabling an aircraft to pick up a large load from terrain where landing and take-off runs are not feasible.

Still another object of the present invention is to provide a novel method for transferring a load from the ground to an aircraft in flight or conversely from an aircraft in flight to the ground.

It is a further object of the present invention to provide a novel method for quickly establishing a flexible connection between aircraft in flight.

Yet another object of the present invention is to provide an improved method for quickly establishing a flexible connection between airplanes while in circling flight about an object located centrally of the flight circle.

Another object is to provide adequate ballast to cause the flexible connecting lines quickly to become stable, thus enabling a connection to be made to the load on the ground.

Still another object of the present invention is to provide a novel method for protecting the launching ground crew and launching devices from the danger of the load swaying while the load is being lifted into a position adjacent one or more airplanes in circling flight.

Yet another object is to provide a novel method for dropping a line to a ground crew from two or more airplanes in circling flight in such a manner that the end of the line strikes the ground at or adjacent to the axis of the flight circle.

Still another object is to provide a novel method for controlling a load while it is being lifted to or lowered from an airplane so as to prevent the load from striking trees, rocks, ship masts or other obstacles.

Other objects and advantages will become apparent from the following description of alternative preferred forms for practicing the present invention which are illustrated in the accompanying drawings, in which Fig. 1 and Fig. 2 are diagrammatic plan and side views respectively of two airplanes in flight and associated mechanism at approximately the commencement of the operation of shifting a load from the ground to one of the airplanes;

Figs. 3 and 4 are views similar to Figs. 1 and 2, respectively, showing a further step in the movement of the load from the ground to one of the airplanes;

Figs. 5 and 6 are plan and side views respectively of a still further stage in the operation of transferring the load from the ground to one of the aircraft;

Figs. 7 and 8 are plan and side views of yet a further stage in the transference of the load to one of the aircraft;

Figs. 9 and 10 are similar views showing a still further stage in the operation of lifting the load;

Figs. 11 and 12 are plan and side views respectively of the completion of the operation of transferring the load from the ground to one of the airplanes, all accomplished while the airplane is in flight;

Fig. 13 is a perspective view of one form of apparatus which can be used on the ground to aid in the operation of transferring a load to an airplane in flight, this apparatus being shown diagrammatically in the even numbered figures from 2 to 12;

Fig. 14 is a diagrammatic view of two airplanes and associated mechanism, illustrating one method for passing a cable from one airplane to another while the two airplanes are in flight. In the present instance this method is used to facilitate landing of the load carried by one of the airplanes while the airplane remains in flight;

Fig. 15 is a perspective view of the commencement of the operation of landing a load while the airplane remains in flight;

Fig. 16 is a diagrammatic plan view illustrating a somewhat later stage in the operation of landing a load carried by an airplane while the airplane remains in flight;

Fig. 17 is a diagrammatic perspective view illustrating an alternative method for transferring a load from the ground to a position between a pair of airplanes in flight;

Figs. 18 to 24 are diagrammatic plan views of successive stages in the operation of lifting the load into a position between a pair of airplanes in flight so that the two airplanes can fly away in tandem with the load supported between them;

Fig. 25 is an alternative position in which the two airplanes can carry the load between them if desired; and Figs. 26 and 27 are diagrammatic plan and perspective views, respectively, illustrating a method for lowering a line connected to two or more airplanes.

In general the problem to be solved by the present invention is the lifting of a load, indicated in the drawings by the numeral 30, from a position at rest upon the ground into a position immediately beneath an airplane. This problem is complicated by the fact that the airplane must continuously move rapidly in order to sustain itself in flight and by the fact that when the airplane is circling above an object it is lifting, strong centrifugal forces act upon the object and tend to make it swing outwardly. In Fig. 13 of the drawings, I have shown a portable stand which, although unnecessary for practicing the present invention in certain of its aspects, is of value in aiding in the control of the load being lifted. Its use is particularly desirable when the load is lifted from wooded or otherwise hazardous terrain where there is some danger of the load hitting trees, rocks, buildings or other objects.

The stand in the present instance comprises a motor truck 32 provided with an elevated stand 34 having a platform 36 on the top thereof. This truck is shown with a portable ramp 38 extending downwardly from the platform. In the present instance a divided type ramp is shown which is adequate for positioning vehicles, such as reconnaissance cars, tanks, or the like on top of the platform 36 inasmuch as these vehicles can be driven up the ramp on their own wheels or tracks. Of course, other types of ramps can be used when desirable so as to aid in the placement of other types of loads in a position on the platform 36. To aid in steadying the device, the platform is braced to the sides by cables 40 secured to stakes 42 or other anchors driven into the ground.

The truck 32 is provided with an engine driven windlass 44 located beneath the platform 36 from which a cable 46 extends upwardly through guide ring 48 in the platform. The windlass and cable are used in a manner to be described presently for steadying the load, while it is being elevated above objects such as trees, buildings and the like in the immediate vicinity. One of its purposes is to prevent the load from striking an obstruction. It also helps in preventing the object from excessive swaying until the object has reached such a point that it is under the full control of the aircraft lifting the load.

Figs. 1 and 2 represent diagrammatically a stage in the lifting of the load just after the lifting operation has started. Prior to the stage represented by these figures, the load 30 is placed in a position upon the platform 36 and the cable 46 is connected to the load. Two airplanes, indicated by the letters A and B are connected by a pair of comparatively long cables. One of these cables, indicated by the numeral 50, depends from the airplane A, which will eventually carry the load, while a similar cable 52 depends from the airplane B and is connected to the free end of the cable 50 by a quick detachable clasp of any suitable type. Although not shown in Figs. 1 to 12, a third cable can be suspended from the point of mutual attachment of the cables 50 and 52 so as to aid operators on the ground making a connection with the depending cables 50 and 52.

The two planes connected as described, fly into a position above the truck 32 and circle while descending or while paying out the cables 50 and 52 from windlasses within the airplanes. When the connected ends of the cables 50 and 52, or the above mentioned third cable, reach the ground, operators on the ground connect the ends of the cables 50 and 52 or the third cable, as the case may be, to the load 30 to be lifted.

The airplane A then starts reeling in the cable 50 while the airplane B simultaneously reels in the cable 52, and the ground crew pay out the cable 46 from the windlass 44. The load is thus lifted upwardly toward the airplanes A and B. Since the airplanes are circling with the load located at the center of the circle, the movement of the load is straight upwardly during the initial portion of the lifting operation, especially if the load is located among obstructions. Figs. 1 and 2 represents the positions of the several elements shortly after the start of the lifting operation.

In Figs. 3 and 4, the load has reached a somewhat higher point and the airplanes A and B have so proportioned the lengths of their respective cables that the load 30 is somewhat nearer to the airplane A than it is to the airplane B. The load, therefore, describes a progressively increasing spiral course while the airplanes describe circles. The airplane B and its cable 52 serve principally to counteract the pendulum effect and centrifugal forces which act upon the load 30 as the load 30 moves away from the center of the circle.

In Figs. 5 and 6 the lifting operation has continued and the load has reached a considerable higher point and is describing larger spirals with the airplane A still supplying the principal lifting force, while the airplane B opposes the tendency of the load 30 to swing wildly away from the axis of the flight circle. After the load has reached approximately this position, the cable 46 is disconnected from the load and the load is under the full control of the airplanes A and B. Any suitable remotely controlled detachable connector can be used for securing the cable 46 to the load.

In Figs. 7, 8, 9 and 10 the airplanes A and B are shown in approximately their same positions with the cable 50 becoming shorter and shorter as the load is moved toward the airplane A, while the cable 52 leading to the airplane B is at all times kept the proper length to oppose the centrifugal force tending to swing the load 30 outwardly away from the airplane B. In Figs. 11 and 12 the load has finally reached a position immediately beneath the airplane A where it can be tightly secured in place by the crew within the airplane A. The cable 52 is disconnected from the load and is retracted into the airplane B. The airplane A then flies away to its point of destination while the airplane B can be used to transfer another load to another airplane, if desired.

This method may be varied slightly in that it is not essential that the ends of the cables 50 and 52 be connected together before being connected to the load. If desired the airplane A can be circled above the load while its cable 50 is being secured, and then the airplane B can join the flying circle and have its cable 52 secured to the load. The two airplanes A and B continue to circle while the cable 50 is retracted to bring the load 30 to carrying position, and the cable 52 has its length adjusted to guide the load and prevent it from swinging outwardly from the flight circle. The latter stages of this method are the same as those described with reference to the steps exactly illustrated in Figs. 1 to 12.

Although I have described two airplanes A and B as being used to lift and guide the load 30 in Figures 1 to 12, it will be appreciated that each of these airplanes can be replaced by a group of several airplanes if desired. For instance, instead of the single airplane A being used to lift the load, two or more airplanes can be secured together and can be located generally at the position A, and these several airplanes can divide the load between them while lifting it into position. Similarly, several airplanes at position B can be used for guiding the load during the lifting operation. After the load has been lifted into place, all but one of the airplanes can be disconnected from the load if the one airplane is capable of carrying the load.

When the airplane A reaches its point of destination, it preferably establishes a connection with another airplane which assists it in landing the load. One method for establishing such contact is shown in Fig. 14. Here an airplane indicated by the letter C pays out a cable 54 towing a heavy fabric target 56, much in the manner that airplanes are frequently used for towing sign banners for advertising purposes. This target can be steadied by sleeves 58 if desired. The airplane A flies near the target and projects a barbed harpoon 60 attached to a line 62, into the target. The barbs at the end of the harpoon 60 prevent the harpoon from being withdrawn from the target, thus enabling the airplane A to reel in the line 62 carrying with it the target and the end of the cable 54. The description of the particular target shown is given for purposes of illustration only, it being appreciated that other types of targets may be used for generally the same purpose.

After the target 56 is taken into one of the airplanes, for instance, the airplane A, it is removed from the cable 54 and the end of the cable 54 is connected to the cable 50 or its load 30. Fig. 15 represents this stage in the method of landing the load. Preferably a cable 64 is connected to the load and trails freely and is intended to be grasped by the ground crew to aid in handling the load during landing.

In Fig. 16 the airplane C is shown as increasing its speed beyond that of the airplane A and flying at a lower level so that the two airplanes gradually move into a position opposite each other in a circle where the airplane C can apply a force through its cable 54 to prevent the load 30 from swinging outwardly away from the position beneath the airplane A. After the airplane C has reached this position the airplanes and the load correspond generally with the positions of the airplanes A and B in Figs. 11 and 12. The load is then lowered and landed by a series of steps which can be considered as the reversal of those from 1 to 12.

It will be seen that the process described enables a load to be lifted from the ground into a position beneath an airplane while the airplane is in flight, and further that by the practice of this method, the load can be kept under control at all times so as not to produce large stresses upon the airplanes in flight, such as would be produced if the load were permitted to sway.

In Figs. 26 and 27, taken in conjunction with Figs. 14 and 16, I have shown a method for flexibly connecting two airplanes while in flight, and later lowering a cable from this connection to the ground where it can be grasped by a ground crew. This method is used principally for picking up a load from the ground and lifting it into a position adjacent one or both of the aircraft. It may, for instance, be considered as a preliminary step to be taken before the step shown in Figs. 1 and 2. As shown in Fig. 14, the airplane A connects a line with the target and thus establishes a flexible connection with the airplane C. That is, airplane A retrieves the target and connects a line 80 to the end of the line 54. One end of a coil of rope 82 is suspended in coiled condition at the point of juncture of the two lines 80 and 54. The two airplanes then maneuver into a circle after the manner illustrated in Fig. 16. Subsequently the airplane C retrieves a portion of its line 54, thus drawing out the line 80 from the airplane A, so as to bring the suspended coil 82 to the center of the flight circle. This position is shown in Fig. 26.

After the above position has been assumed, one of the airplanes by actuating a trip line 84 causes the coiled rope to uncoil and fall straight downwardly to a position where its lower end can be grasped by a ground crew. This straight fall will be facilitated if a weight is attached to the end of line 82. This weight or other appropriate ballast, located at the juncture of lines 54 and 80 while the coil is being moved to the axis of the flight circle, also aids in stabilizing the lines 54 and 80, thus making them behave in a more predictable manner.

The ground crew grasps the lower portion of the rope 82 and pulls the juncture between the lines 80 and 54 downwardly as the planes pay out the cables 54 and 80, until this juncture point can be attached to the load. The particular advantage gained by moving the coil of rope 82 to the center of the flight circle before permitting it to drop is that this maneuver permits the coil to drop straight downwardly. If instead it were paid out from the airplane A before the juncture point was moved to the center of the flight circle, the depending line 82 would sway and gyrate considerably and would be difficult for the ground crew to grasp. Any desired satisfactory manner may be used for causing the coil of rope to be secured adjacent the axis of the flight circle, which in this example is coincidental with this juncture point, and for enabling the coil to be dropped from this juncture point when desired. One simple expedient for accomplishing this operation is to coil the rope 82 and to tie the coil to the juncture point with a comparatively light cord. This light cord can be attached to the end of the trip line 84 so that when the trip line 84 is pulled, a releasable knot in the cord will be released or the cord will be broken, thus permitting the rope to drop.

Although I have described the depending line 82 as for the purpose of guiding the cables 54 and 84 as they are lowered, it will be appreciated that if desired, the line 82 can be secured directly to the load. Further, if desired, the load itself may contain a hoisting device which can be secured to the line 82 so that the load together with the hoisting device can be lifted to the point of juncture between the cables 54 and 84. Fig. 27 represents this stage in the method of landing the load. Preferably a cable 64 is connected to the load and trails freely and is intended to be grasped by the ground crew to aid in handling the load during landing.

In Figs. 17 to 25 I have shown a method for lifting a load into a position between two or more airplanes in flight. In the present illustration two airplanes in flight which will carry the load are indicated by the letters D and E. These two airplanes are connected to opposite ends of a cable 66, the central point of which is connected to a cable 68 which extends downwardly a short distance where it is connected by detachable connectors to three cables 70, 72 and 74. These latter cables extend outwardly and are connected at their opposite ends respectively to airplanes F, G and H. All five of these airplanes circle while the end of the cable 68 is attached to a load 76. While still circling the airplanes lift the load sufficiently to clear all obstructions. Then while the airplanes D and E are circling, one of these airplanes flies faster than the other so as to fly around the circle into a position behind the other. In the present instance, the airplane E is shown as flying faster than the airplane D and the speed ratio between the two is so adjusted that both airplanes will fly around the circle several times before the airplane E gets into a position behind airplane D.

Such circling of the airplanes causes the load 76 to describe a spiral shown by the broken lines in the several figures. While it is describing this spiral, the load will have a tendency to be swung outwardly away from the center of rotation, because of the centrifugal force acting upon it, but this tendency is counteracted by the three airplanes F, G and H which also fly in circles and adjust the lengths of their cables in such a manner that the load 76 describes the proper spiral.

When the airplane E is behind the airplane D, the two airplanes take charge of the load and fly away in a straight line with the load 76 suspended between them. The airplanes F, G and H at this point disconnect their cables from the load and return to their bases. If desired, the airplanes D and E can move into a side by side position with the load between them as seen in Fig. 25, or they can continue to their objective in a tandem relationship.

Although three airplanes F, G and H are used in the present illustration principally to steady the load, it will be appreciated that more or less planes can be used for this purpose as desired. Also, after the planes E and D have reached the position shown in Fig. 24, the load can be transferred to one of the planes. For instance, the plane D can reel in its cable while the plane E pays its cable out until the load is located immediately beneath the plane D, after which the cable connected to plane E is disconnected from the load.

Another arrangement of airplanes that can be used for lifting and guiding the load is illustrated in Figs. 18 to 23, if the airplanes D and E are considered as flying at the lower level while the airplanes F, G and H are considered as flying at the higher level. With this arrangement in mind, the airplanes F, G and H follow each other in a circular course and maintain their spacing. One of these airplanes, for instance, the airplane G, reels in its cable faster than the airplanes F and H. Thus the load will spiral outwardly toward the airplane G, while the airplanes F and H counteract the centrifugal force and also aid in preventing swaying of the load. The two airplanes D and E flying at the lower level gradually approach each other in their circular course and thus aid in guiding the load into a position beneath the airplane G. Since meanwhile the load is rising, the airplanes D and E should climb so as to keep into position substantially opposite the load horizontally.

Although throughout the specification I have frequently used two or three or more airplanes in an illustrative manner, it should be appreciated that these airplanes are illustrative more of positions than they are necessarily of single airplanes. In any of the several arrangements shown, a group of airplanes can be used in place of a single airplane if conditions make such use advisable. In the last illustration, for instance, I have shown three airplanes F, G and H at the higher level. These three airplanes could be replaced by two airplanes in which the positions F and H could be omitted and the second airplane could be placed opposite the airplane G. Similarly, four airplanes could be use if desired. The same is true of the group of two airplanes used at the lower level. Similarly, also I have recited the planes D and E as climbing as the load is shifted. This movement, however, can be merely relative. That is, the planes D and E should climb relative to the planes F, G and H. The group of five airplanes can meanwhile be ascending or descending.

Having described my invention, what I claim as new and useful and desire to secure by Letters Patent of the United States is:

1. In the art of transportation by airplanes, the method comprising the steps of flexibly connecting an object to two airplanes in flight, flying each airplane in a substantially circular course about the object with one of said airplanes substantially opposite the other of said airplanes, causing one of the airplanes to retract the flexible connection between itself and the object, whereby the object is gradually lifted into a position beneath said airplane, simultaneously causing the second of said airplanes to adjust the length of its flexible connection to the object while maintaining a position substantially opposite the first airplane such that the object describes a spiral of progressively increasing diameter as it approaches the first airplane, and finally disconnecting the second airplane from the object.

2. In the art of transportation by airplanes, the method of transferring a stationary load from the ground to an airplane in flight comprising, providing the airplane which is to carry the load, providing a second airplane, connecting a cable from the first airplane to the load, causing the first airplane to circle about the load, connecting the load to the second airplane, causing the second airplane to circle about the load, positioning the two airplanes at substantially opposite points in the circular path they are flying, causing the first airplane to reel in its cable so as gradually to lift the load into a position adjacent said airplane, causing said second airplane while maintaining a position substantially opposite said first airplane to adjust the length of its cable so as to prevent centrifugal force from swinging said load outwardly substantially beyond the circular flight path of the first airplane, and finally disconnecting the cable connection between the load and the second airplane.

3. In the art of transportation by airplanes, the method of landing a load without landing the airplane carrying the load, comprising providing a first airplane to carry the load and a second airplane, suspending the load from the first airplane by a cable attached to a windlass or similar means in said airplane, establishing a cable connection between the second of said airplanes and said load while said airplanes are in flight, causing said airplanes to circle with said airplanes located at approximately opposite points in the circular path, causing the first airplane to pay out its cable so as to lower the load, causing the second airplane to adjust the length of its cable so as to oppose the centrifugal forces acting on said load while said load is being lowered so as to cause said load to describe an inwardly spiraling course as it descends, depositing said load upon the ground when it its velocity has been reduced substantially to zero, and finally disconnecting both of said cables from said load.

4. In the art of transportation by airplane, the method of elevating a stationary load from the surface of the ground to an airplane in flight, comprising causing an airplane to circle above said load and while so circling to drop a cable, connecting said cable to said load while said airplane is circling, providing a second airplane, physically connecting the second airplane to said load while said second airplane circles said load, causing the first airplane to lift said load so as to cause said load to follow an outwardly extending spiral path at progressively increasing velocity until said load reaches substantially the velocity of said first airplane, causing the second of said airplanes during the last said operation to steady said load and guide it in its spiral movement so as to prevent excessive strains being imposed upon the first airplane.

5. In the art of transportation by aircraft, the method comprising the steps of flexibly connecting an object to two airplanes, flying each airplane in a substantially circular course about the object, providing a second set of airplanes, a flexibly connecting said second set of airplanes to the object by means permitting adjustments in the effective lengths of the flexible connecting means, flying said second set of airplanes in a circular course at a lower level than the said two airplanes, causing the two airplanes to be located at substantially diametrically opposite points in their circular courses while initially lifting the object by the said two airplanes, accelerating the speed of one of the group of two airplanes relative to the other while still maintaining a substantially circular course until both of the group of two airplanes are flying in approximately the same direction, and simultaneously adjusting the lengths of the flexible connections between the second set of airplanes and the object so as to guide the object in a spiral course as the accelerated one of the group of two airplanes approaches the other airplane in its group.

6. In the art of transportation by airplanes or the like, the method of moving an object by a plurality of prime movers flexibly connected thereto which comprises the steps of moving each prime mover in a substantially circular course with the object suspended therebetween, accelerating or decelerating the speed of less than all of the prime movers to cause the object to move laterally of the axis of movement while describing a spiral course thereabout, whereby the velocity of the object is gradually varied with respect to the velocity of the prime movers, and providing a second set of prime movers flexibly connected to the object by means permitting adjustments in the effective lengths of the connecting means, and controlling the connections between the second set of prime movers and the object so as to prevent swaying of the object and to counteract centrifugal forces acting upon the object as it describes a spiral course.

7. In the art of transportation by airplanes, the method comprising the steps of flexibly connecting an object to a group comprising two or more lifting airplanes by means permitting adjustments in the length thereof, adjusting the length of the flexible connection between the object and the group of lifting airplanes so as to bring the object into closer association with said group, providing a second group consisting of one or more controlling airplanes, flexibly connecting the second group to said object by means permitting adjustment in the length thereof, and maneuvering the second group of airplanes during the lifting operation so as nicely to control the path of movement traveled by said object.

8. In the art of transportation by aircraft, the method comprising the steps of flexibly connecting an object to a group of airplanes, flying said group of airplanes in a substantially circular course about the object, providing a second group of one or more airplanes, flexibly connecting said second group of airplanes to the object by means permitting adjustments in the lengths thereof, flying said second group of airplanes at a lower level than the first group of airplanes, causing the first group of airplanes, while maintaining their positions, to take in their flexible connections so as to lift the load, said flexible connections being taken in in a differential manner so that the load moves toward one of the airplanes while the one or more other airplanes in the group aid in guiding and lifting the load, and maneuvering the second group of airplanes during the lifting operation so as to aid in guiding the load along a desired flight path.

9. In the art of aerial transportation, the method comprising the steps of flexibly connecting an object to two aircraft by means permitting adjustments in the lengths thereof, flying said two aircraft in a substantially circular course about the object, providing another aircraft, connecting said third aircraft to the object, flying said third aircraft at a lower level than the first two aircraft, causing the first two aircraft while maintaining substantially opposite positions, one at each end of a diameter of their substantially common flight circle, to take in their flexible connections so as to lift the load, adjusting the length of said flexible connections so that the load moves toward one of the aircraft while the other of the first two aircraft aids in guiding and lifting the load, and maneuvering the third aircraft so as to aid in guiding the load along the desired flight path.

10. In the art of aerial transportation, the method comprising the steps of flexibly connecting an object to two aircraft in flight, flying each aircraft in a substantially circular course about the object with said aircraft positioned substantially one at each end of a diameter of the flight circle, causing one of the flexible connections between the object and an aircraft to be retracted whereby the object is gradually lifted into a position beneath said aircraft, simultaneously causing another flexible connection between the object and the other aircraft to be adjusted in length so that the object is caused to describe a controlled spiral of progressively increasing diameter as it approaches the first aircraft, thereby progressively increasing its speed until it approaches the velocity of the aircraft, and finally disconnecting the second aircraft from the object.

11. In the art of aerial transportation, the method of transferring a stationary load from its stationary position to an aircraft in flight comprising, providing the aircraft which is to carry the load, providing a second aircraft, connecting a cable from the first aircraft to the second aircraft, causing both aircraft to circle about the load, connecting the load to the flexible connection so established while the two aircraft are flying at substantially opposite ends of a diameter of their circular path, causing one aircraft to reel in its cable so as gradually to lift the load into a position adjacent said aircraft, causing the other aircraft while maintaining a position substantially opposite said first aircraft to adjust the length of its cable so as to counteract the effect of centrifugal force and prevent the load from swinging outwardly substantially beyond the desired path, and finally disconnecting the cable connection between the load and the second aircraft.

12. In the art of aerial transportation, the method of landing a load without landing the airplane carrying the load, comprising providing a first airplane to carry the load and a second airplane, establishing a cable connection between said second airplane and the load carried by said first airplane, while said airplanes are in flight, causing said airplanes to circle with said airplanes being located at approximately opposite points on their circular course, causing the first airplane to pay out its cable to which the load is attached so as to lower the load, causing the second airplane to adjust the length of its cable so as to oppose the centrifugal forces acting upon said load while said load is being lowered so as to cause said load to describe an inwardly spiraling course as it descends, depositing said load upon the ground when its velocity has been reduced substantially to zero, and finally disconnecting both of said cables from said load.

13. In the art of aerial transportation, the method of elevating a load from stationary position to an airplane in flight, comprising causing an airplane to circle above said load and while so circling to drop a cable, connecting said cable to said load, providing a second airplane, flexibly connecting the second airplane to said load while said second airplane circles said load, causing the first airplane to lift said load so as to cause said load to follow an outwardly expanding spiral path at progressively increasing velocity until said load reaches substantially the velocity of said first airplane, causing the second of said airplanes during the last said operation to steady said load and guide it in its spiral movement so as to prevent excessive strains being imposed upon the first airplane.

14. In the art of aerial transportation, the method comprising the steps of flexibly connecting an object to two airplanes, flying each airplane in a substantially circular course about the object, providing a second set of airplanes, flexibly connecting said second set of airplanes to the object by means permitting adjustments in the lengths thereof, flying said second set of airplanes in a circular course around the object at a lower level than the first mentioned airplanes, causing the first mentioned airplanes to be located at substantially diametrically opposite points in their circular courses while initially lifting the object, subsequently manuevering at least one of said two airplanes so as to cause one to approach the other in their flight circle, and simultaneously adjusting the lengths of the flexible connections between the second group of airplanes and the object so as to guide the object in a spiral course as the two mentioned airplanes approach each other.

15. In the art of aerial transportation the steps of flexibly connecting at least two aircraft, flying them in a circular course while maintaining positions one at each end of a diameter of the flight circle, causing the flexible connection between the two planes to be substantially taut, causing an appropriate length of line connected to one of said aircraft to be supported by said flexible connection and to come to be located at the center of said connection, causing said line to drop while remaining connected to the first flexible connection substantially at the center of the circle, whereby the line is so disposed that it can be attached to a load at a substantially stationary position at the axis of the flight circle.

16. In the art of aerial transportation, the method comprising steps of flexibly connecting an object to two airplanes, flying each airplane in a substantially circular course about the object, providing a second set of airplanes, flexibly connecting said second set of airplanes to the object by means permitting adjustments in the lengths thereof, flying said second set of airplanes in a circular course around the object at a lower level than the first-mentioned airplanes, causing the first-mentioned airplanes to be located at substantially diametrically opposite points in their circular courses while initially lifting the object, subsequently maneuvering said airplanes so as to cause the object to approach said first-mentioned airplanes, and simultaneously adjusting the lengths of the flexible connections between the object and the airplanes so as to guide the object in a spiral course as it approaches one of said first-mentioned airplanes.

17. In the art of aerial transportation, the method comprising the steps of flexibly connecting an object to a set of airplanes by means permitting adjustments in the lengths thereof, flying each of said airplanes in a substantially circular course about the object, providing a second set of airplanes, flexibly connecting said second set of airplanes to the object by means permitting adjustments in the lengths thereof, flying said second set of airplanes in a circular course around the object at approximately the level thereof, causing the first-mentioned airplanes to be located at equally spaced points in the circular course while initially lifting the object, and subsequently maneuvering said airplanes and adjusting the lengths of the flexible connections between said airplanes and the object so as to cause the object to approach one of said first-mentioned airplanes while said second set of airplanes controls the object in the spiral course as it approaches one of said first-mentioned airplanes.

18. In the art of aerial transportation, the steps of flexibly connecting at least two aircraft, flying said aircraft at diametrically opposite positions in a circular course about and above the load, providing a flexible connection connected to the flexible connection between said aircraft near the center thereof and adapted to be suspended therefrom, providing a control for releasing one end of said last-mentioned connection operable from one of said aircraft, and operating said control to drop one end of said flexible connection toward the ground so that it hangs suspended without substantial swaying with its lower end adjacent a predetermined point on the ground.

19. In the art of aerial transportation, the steps of flexibly connecting at least two aircraft, flying said aircraft at diametrically opposite positions in a circular course about and above a load, providing a coiled flexible connection attached to said first-mentioned flexible connection adjacent the center thereof, providing a control for releasing one end of said coiled connection operable from one of said aircraft, and operating said control to release said coiled connection to drop one end thereof toward the ground so that it hangs suspended without substantial swaying with its lower end adjacent a predetermined point on the ground.

20. In the art of aerial transportation, the method comprising the steps of flexibly connecting an object to an airplane in flight, providing a movable guiding device anchored to the ground, flexibly connecting the movable guiding device to the object, flying the airplane around and above said guiding device in a circular course, operating the airplane and adjusting the length of the flexible connection between the airplane and the object to raise the object toward the airplane, and paying out the flexible connection between the object and the guiding device so as to control the path of the object as it approaches the airplane.

FRANÇOIS ALABRUNE.